(12) United States Patent
Hoshino et al.

(10) Patent No.: US 7,355,736 B2
(45) Date of Patent: Apr. 8, 2008

(54) SCANNING TYPE PRINTING APPARATUS

(75) Inventors: Takashi Hoshino, Kanagawa (JP);
Toshiya Kojima, Kanagawa (JP);
Seiichi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 887 days.

(21) Appl. No.: 10/285,507

(22) Filed: Nov. 1, 2002

(65) Prior Publication Data
US 2003/0081270 A1    May 1, 2003

(30) Foreign Application Priority Data
Nov. 1, 2001    (JP)    ............................ 2001-336111

(51) Int. Cl.
*G06K 1/00* (2006.01)
*B41J 29/393* (2006.01)

(52) U.S. Cl. .................. 358/1.15; 358/1.16; 358/1.18; 347/19

(58) Field of Classification Search .................. 347/19; 358/1.15, 1.16–1.18
See application file for complete search history.

(56) References Cited

U.S. PATENT DOCUMENTS

| | | | |
|---|---|---|---|
| 5,825,995 A * | 10/1998 | Wiklof et al. | 358/1.18 |
| 5,937,152 A * | 8/1999 | Oda et al. | 358/1.16 |
| 6,761,426 B2 * | 7/2004 | Tsuchiya et al. | 347/19 |

FOREIGN PATENT DOCUMENTS

| | | |
|---|---|---|
| JP | 10-035028 A | 2/1998 |
| JP | 10-035033 A | 2/1998 |
| JP | 2001-253121 A | 9/2001 |

* cited by examiner

*Primary Examiner*—Houshang Safaipour
(74) *Attorney, Agent, or Firm*—Sughrue Mion, PLLC

(57) ABSTRACT

The scanning type printing apparatus prints an image and/or a text on a recording medium in accordance with image data and/or text data while moving on the recording medium. The apparatus includes a moving unit, an image processing unit that, prior to printing, rotates the image and/or the text to be printed based on the image data and/or the text data and/or reverses front and back thereof; and an ejection head that includes at least one nozzle and at least one ink ejection unit that eject ink.

9 Claims, 3 Drawing Sheets

SCANNING TYPE PRINTING APPARATUS

BACKGROUND OF THE INVENTION

1. Field of the Invention

The present invention relates to a scanning type printing apparatus that performs printing on a recording medium through scanning of a main body provided with a printing means, and more particularly to a scanning type printing apparatus that uses an ink jet recording method and is capable of printing a desired text, drawing, or the like even in the case where it is difficult to move a recording medium and it is hard to change the moving direction of a main body.

2. Description of the Related Art

Conventionally, there have been proposed various scanning type printing apparatuses that each perform printing on an object to be printed through hand-held scanning while checking a print state or a print position (see JP 10-35028 A, JP 10-35033 A, JP 2001-253121 A, and the like). In JP 10-35028 A, there is disclosed a handheld type printing apparatus including on its top surface portion an LCD that is a liquid crystal displaying apparatus (hereinafter referred to as "Related Art 1"). In Related Art 1, the LCD is controlled so that scroll-displaying is performed in accordance with the print operation of this apparatus. This makes it possible to display a print state and to prevent a situation where the print operation is terminated halfway through the printing. As a result, it becomes possible to prevent print shifts in advance.

In JP 10-35033 A, there is disclosed a hand-held scanning type printing apparatus that is capable of printing the same title on both sides of a tag seal for indexing without reversing this seal (hereinafter referred to as "Related Art 2"). The printing apparatus of Related Art 2 is provided with a recording means for performing printing on a recording medium by moving on the recording medium. This printing apparatus also includes a moving amount detection means for detecting a moving amount of the recording means, a designation means for designating a tag print mode in which printing is performed on the tag seal, and a control means for controlling the recording means so that, at the time of the designation of the tag print mode, print data is reversed horizontally and vertically and the printing is performed from the last character.

In Related Art 1 described above, however, the moving direction during the hand-held scanning and the direction of characters to be printed are unchangeable, so that in the case where the printing direction on a recording medium should be changed, it is required to change the direction of the recording medium or to change the hand-held scanning (moving) direction of the printing apparatus. Consequently, there is a problem that printing involves a difficulty under a condition where it is difficult to move the recording medium and it is hard to change the moving direction. On the other hand, in Related Art 2 described above, it is difficult to predict a print result. In particular, it is difficult to predict a print direction. There is also a problem that, in some cases, scanning is performed in a wrong direction and printing is not performed correctly.

SUMMARY OF THE INVENTION

An object of the present invention is to solve the prior art problems described above by providing a scanning type printing apparatus with which a text, a drawing or the like can be printed in a desired direction even in the case where it is difficult to move a recording medium and it is hard to change the moving direction of a main body.

In order to attain the object described above, the present invention provides a scanning type printing apparatus that includes a moving means for moving the scanning type printing apparatus on a recording medium, and prints at least one of an image and a text on the recording medium in accordance with at least one of image data and text data while moving on the recording medium, the scanning type printing apparatus comprising an image processing unit that, prior to printing, rotates at least one of the image and the text to be printed on the recording medium based on at least one of the image data and the text data and/or reverses front and back thereof and an ejection head that includes at least one nozzle that ejects ink and at least one ink ejection means, each of which is arranged so as to correspond to each of at least one nozzle and is modulation-driven in accordance with at least one of the image data and the text data processed by the image processing unit.

It is preferable that the scanning type printing apparatus further comprises a receiving unit that receives at least one of the image data and the text data supplied from an external device. It is also preferable that the scanning type printing apparatus further comprises a storage unit in which at least one of the image data and the text data supplied from one of the external device and a data storing medium is stored.

Preferably, image data of a plurality of images and a plurality of pieces of text data are stored in the storage unit, and the image processing unit synthesizes at least one of image data of a first image and a first piece of text data read out from the storage unit with at least one of image data of a second image and a second piece of text data read out from the storage unit.

Further, preferably, at least one of the image data and the text data received by the receiving unit is stored in the storage unit, and the image processing unit synthesizes at least one of the image data and the text data received by the receiving unit from the external device with at least one of the image data and the text data stored in the storage unit.

In addition, it is also preferable that the scanning type printing apparatus further comprises a display device that displays at least one of the image and the text to be printed on the recording medium, wherein the display device displays at least one of the image and the text which have been rotated and/or whose front and back have been reversed prior to the printing. In the present invention, a text refers to an expression composed of symbols or letters, or combinations of both. Also, text data refer to data of such texts composed of symbols or letters, or combinations of both. In addition, in the present invention, image data refer to collective data that form an image.

DETAILED DESCRIPTION OF THE PREFERRED EMBODIMENTS

Figure 1:
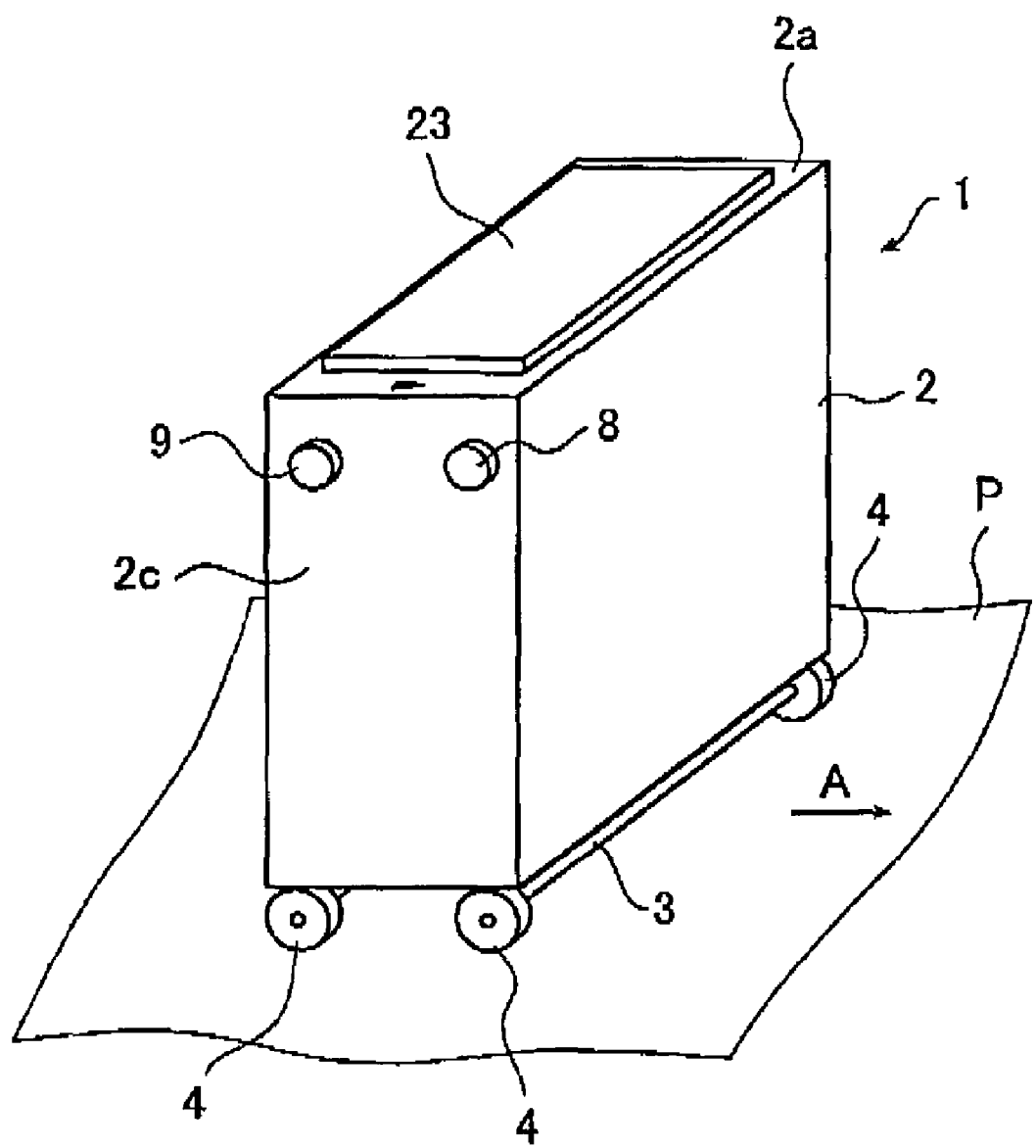
FIG. 1 is a perspective view showing a scanning type printing apparatus according to an embodiment of the present invention.
Figure 2:
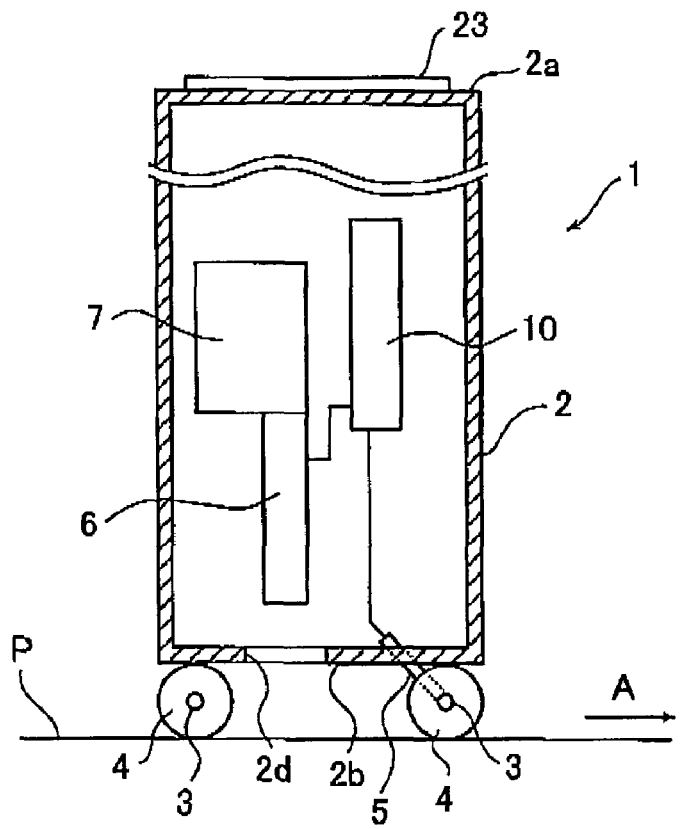
FIG. 2 is a cross-sectional view showing the scanning type printing apparatus according to the embodiment of the present invention.
Figure 3:
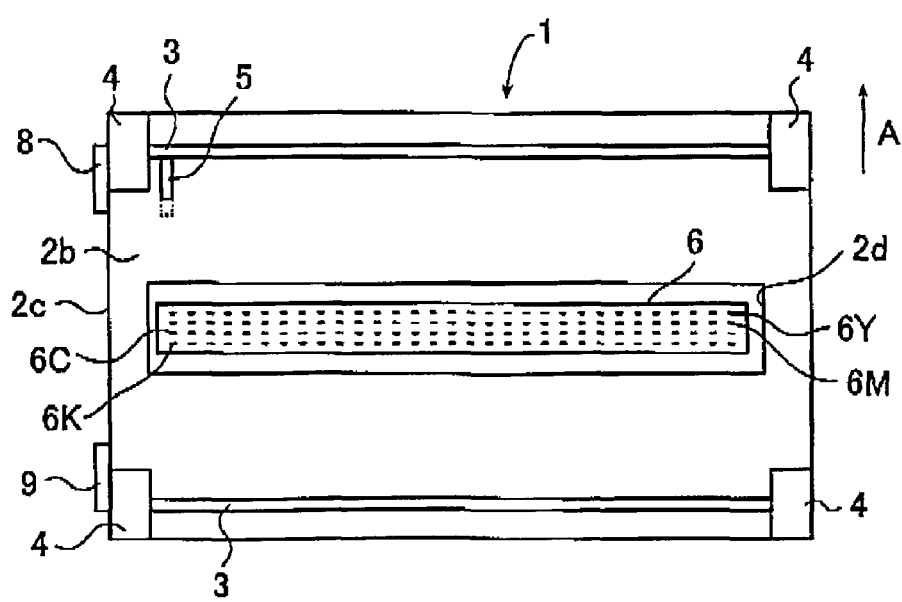
FIG. 3 is a bottom surface view showing the scanning type printing apparatus according to the embodiment of the present invention.
Figure 4:
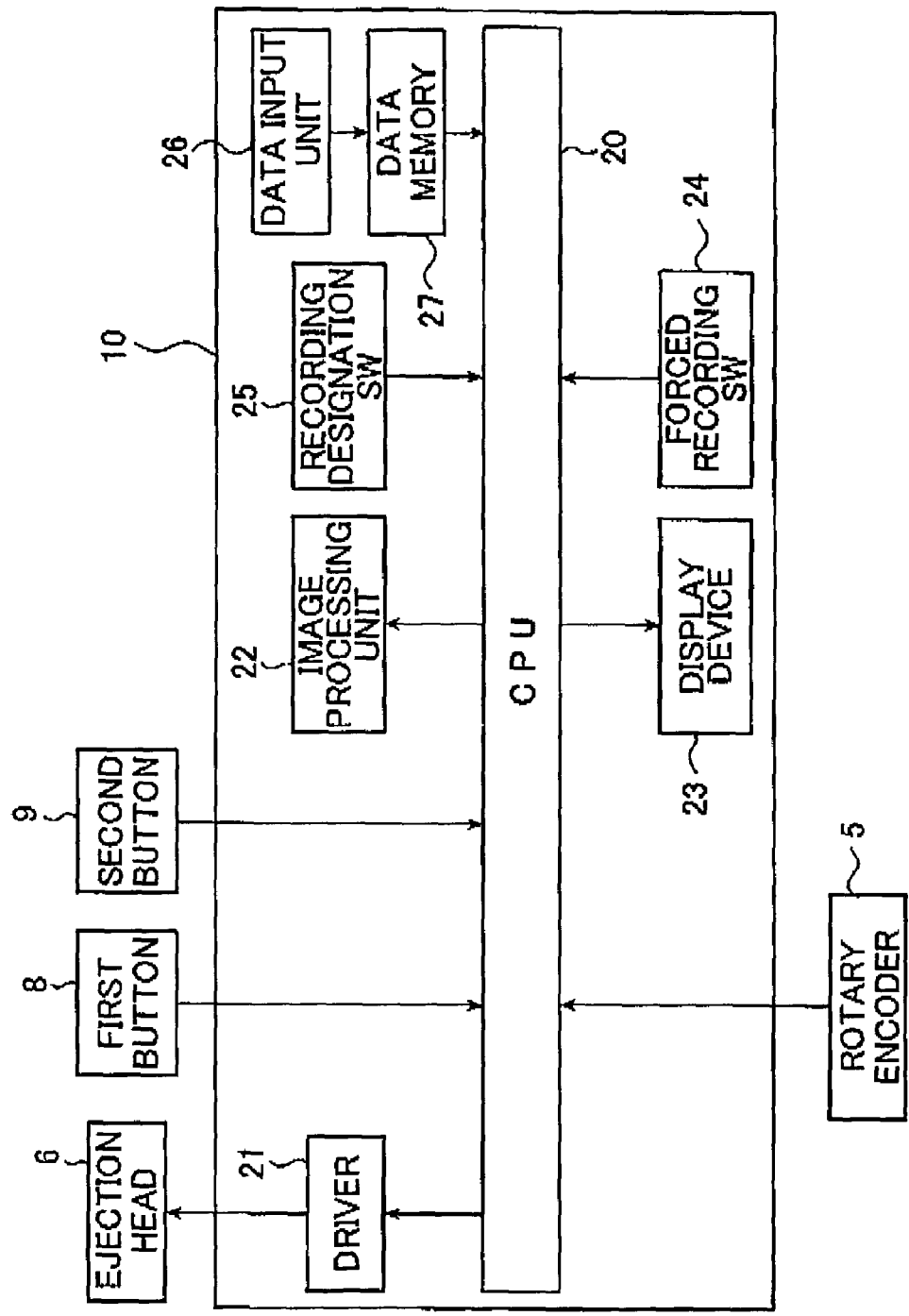
FIG. 4 is a block diagram showing a control unit of the scanning type printing apparatus of the embodiment.

Hereinafter, the scanning type printing apparatus according to the present invention will be described in detail based on a preferred embodiment shown in the accompanying drawings. FIG. 1 is a perspective view showing a scanning type printing apparatus according to an embodiment of the present invention, FIG. 2 is a cross-sectional view showing the scanning type printing apparatus according to the embodiment of the present invention, and FIG. 3 is a bottom surface view showing the scanning type printing apparatus according to the embodiment of the present invention. FIG. 4 is a block diagram showing a control unit of the scanning type printing apparatus of this embodiment.

As shown in FIG. 1, the scanning type printing apparatus 1 (hereinafter simply referred to as the "printing apparatus") of this embodiment has a construction where a display device 23 is provided on a top surface 2a of an enclosure 2 having a virtually rectangular parallelepiped shape. It is possible for this display device 23 to display the whole or a part of an image or a text to be printed, for instance. As shown in FIG. 2, an ejection head 6, an ink tank 7, and a control unit 10 are provided inside the enclosure 2. In this embodiment, the enclosure 2 is hand-held and is scanned on a recording medium P in one direction shown by arrow A in FIG. 1 (hereinafter referred to as the "auxiliary scanning direction A"). In this manner, there is performed printing. On a bottom surface 2b of the enclosure 2, there is formed an opening portion 2d that extends in a main scanning direction orthogonal to the auxiliary scanning direction A within the bottom surface 2b. Wheel axles 3 are provided at both ends of the bottom surface 2b of the enclosure 2 in the auxiliary scanning direction A so as to extend in the main scanning direction. One pair of wheels 4 is provided for each wheel axle 3, with each of the paired wheels being provided for one of both ends of the wheel axle 3. A rotary encoder 5 is fitted to the wheel axle 3 on the upstream side in the auxiliary scanning direction A and generates a pulse signal corresponding to the rotation of the wheels 4 in accordance with the movement of the enclosure 2 in the auxiliary scanning direction A. This pulse signal is sent to a CPU 20 (see FIG. 4) in the control unit 10.

As shown in FIG. 3, the ejection head 6 is provided inside the enclosure 2 at a position that is aligned with the opening portion 2d. This ejection head 6 is a publicly known (ink jet) recording head having nozzles for ejecting ink and ink ejection means that respectively correspond to the nozzles. This ejection head 6 is also a line head in which a plurality of nozzles are arranged in the main scanning direction. For instance, the ejection head 6 includes four nozzle rows arranged in the auxiliary scanning direction A that are a nozzle row 6Y for ejecting Y (yellow) ink, a nozzle row 6M for ejecting M (magenta) ink, a nozzle row 6C for ejecting C (cyan) ink, and a nozzle row 6K for ejecting K (black) ink. When the enclosure 2 is placed vertical to the recording medium P, the recording medium P and the bottom surface 2b are set parallel to each other. The ejection head 6 is installed so as to eject ink from the nozzles in the vertical direction with respect to the bottom surface 2b of the enclosure 2, and the ink is ejected toward an open space outside the enclosure 2.

Also, as shown in FIG. 4, in the control unit 10, there are provided the CPU 20 that takes the overall control of the scanning type printing apparatus 1, a driver 21 that drives the ejection head 6, a recording designation switch (SW) 25 that places the scanning type printing apparatus 1 in a printable state, and a data input unit 26 (reception unit) into which at least one of image data and text data is inputted. The control unit 10 also includes a data memory 27 that stores various data, such as two-dimensional image data and/or text data, inputted into the data input unit 26. The control unit 10 further includes an image processing unit 22 that, prior to printing performs processing for rotating the direction of an image or a text to be printed based on the image data or the text data by ±90° or 180° with respect to the auxiliary scanning direction A of the enclosure 2, performs processing for reversing the front and back of the image or the text, or performs the synthesizing of the image data and/or the text data. The control unit 10 also includes the display device 23, a forced recording switch (SW) 24, and the like. The display device 23 displays various kinds of information, such as the presence or absence of image data or text data in the printing apparatus 1, an image and/or a text to be printed, data synthesized by the image processing unit 22, and a portion of data that is being printed. For instance, a liquid crystal display panel is a suitable example of this display device 23. On a side surface 2c of the enclosure 2, there is provided a first button 8 (see FIG. 1) that switches the contents displayed on the display device 23 that are the image and/or the text based on at least one of the image data and the text data inputted into the data input unit 26, an image or a text stored in the data memory 27, or the like.

The image processing unit 22 is also capable of, after the reversal of the front and back of the image or the text to be printed based on the image data or the text data, performing further rotation by ±90° or 180°. Also, aside from the synthesizing of the inputted image data or the like with image data or the like stored in the data memory 27, the image processing unit 22 is capable of synthesizing data stored in the data memory 27 with data that is also stored in the data memory 27. For instance, it is assumed that among a plurality of pieces of data stored in the data memory 27, a first piece of data is background image data and a second piece of data is image data or text data. In this case, the synthesizing is performed by pasting the second data on the background image. By storing background images in the data memory 27 in this manner, it becomes possible to synthesize the background images with another image or text. This makes it easy to print a synthesized image that contains an image of a fixed design, logo, character or the like. Because the background images are stored in this case, during the printing of a synthesized image, the amount of data to be received from an external device is reduced and it becomes possible to shorten a time taken to create the synthesized image. A second button 9 (see FIG. 1) is also provided on the side surface 2c of the enclosure 2. When a user pushes this second button 9, the image processing unit 22 rotates an image and/or a text and/or reverses the front and back thereof, and an image and/or text obtained as a result of this processing is displayed on the display device 23. Note that in the data memory 27, there are stored image data and/or text data that are not processed after inputted into the data input unit 26, data synthesized by the image processing unit 22, and data having a predetermined pattern, for instance.

This control unit 10 operates in this manner, so that it becomes possible to adjust ink ejection timings based on the output from the rotary encoder 5 and to rotate the direction of an image or a text generated from image data or text data to a predetermined direction.

Next, there will be described an operation of the scanning type printing apparatus 1 of this embodiment. First, when the printing apparatus 1 is powered on, various kinds of information, such as an image and/or a text based on image data and/or text data, is displayed on the display device 23, for instance. There occurs no problem even if there is also displayed the presence or absence of image data or text data in the data input unit 26 or the data memory 27.

Next, in the case where at least one of image data and text data exist, the user pushes the first button 8 and selects a record image that he/she wishes to print. These operations need only be performed with a publicly known method, such as a GUI (Graphical User Interface), that uses the display device 23.

In the case where image data or text data exists in the data memory 27, it is checked whether the data is image data or text data corresponding to image recording using the display device 23. If it has not been found that there is stored the image data or the text data corresponding to the image recording, the image data or the text data is fetched from the data input unit 26 into the data memory 27.

It is sufficient that this fetching of the image data or the text data is performed with a publicly known method such as the downloading in a wired or wireless manner or the reading from a loaded recording medium. Also, there occurs no problem even if a source for supplying the image data and the text data is the same as that used in various kinds of printers, such as a scanner (image reading apparatus), an external device like a computer or a digital camera, or a communication network. Further, there occurs not problem even if image data having predetermined patterns is stored in the data memory 27, in addition to the supplied image data or text data. In this case, a user checks each pattern displayed on the display device 23 by pushing the first button 8 provided for the enclosure 2, he/she selects a desired pattern, and image recording is performed using image data having this pattern. Note that no specific limitation is imposed on the image data and it is possible to include a bitmap, a GIF image, a JPEG image, and the like as examples thereof.

In this case, if the image data or the text data corresponding to the image recording exits in the data memory 27, there occurs no problem even if the image data or the text data is displayed on the display device 23. Note that an arrow showing the auxiliary scanning direction A is printed on the outer edge of the top surface 2a of the enclosure 2, for instance. In this embodiment, the scanning direction of the enclosure 2 is limited to one direction (auxiliary scanning direction A). Therefore, in the case where the direction of an image or a text with respect to the auxiliary scanning direction A does not coincide with a desired direction, the user pushes the second button 9, thereby changing the direction of the image or text to be printed to the desired direction using the image processing unit 22. The image or text, whose direction has been changed in this manner, is displayed on the display unit 23, so that it becomes possible for the user to check an image or a text that he/she is attempting to print. Also, even in the case where data stored in the data memory 27 is synthesized in the image processing unit 22, the whole of the synthesized image or a part thereof to be printed is displayed on the display device 23.

Also, the printing apparatus 1 performs printing from the advancing direction side (upstream side in the auxiliary scanning direction A) of the enclosure 2 regardless of which one of an image, a text, and the like is to be printed. In this case, if the recording designation switch 25 is turned on, the user hand-holds the enclosure 2, places the enclosure 2 on the recording medium P, and moves the enclosure 2 in the auxiliary scanning direction A while maintaining contact between the recording medium P and the wheels 4. During the movement of the enclosure 2, which part of the image or the text that the user is attempting to print is being printed is displayed On the display device 23. As described above, in this embodiment, it is possible to perform printing while displaying an image or a text to be printed and checking a printing state, which makes it easy to predict a print result.

It should be noted here that there occurs no problem even if the recording designation switch 25 is turned on/off by the user. Also, there occurs no problem even if the recording designation switch 25 is automatically turned on/off in accordance with the state of the printing apparatus 1, for instance, in accordance with whether recording is possible or impossible.

The CPU 20 detects the moving amount (scanning amount) of the enclosure 2 based on the pulse signal generated by the rotary encoder 5 during the scanning, adjusts ink ejection timings in synchronization with this moving, performs modulation of ink in accordance with a record image or text data, and drives the ejection head 6 using the driver 21 to achieve the ejection of the ink from the ejection head 6 through the modulation. In this manner, the CPU 20 realizes the recording of an image on the recording medium P.

The CPU 20 drives the driver 21 by performing modulation in accordance with the record image in synchronization with the movement of the enclosure 2 by the user, that is, in synchronization with the generation of the pulse signal by the rotary encoder 5, and has the ejection head 6 eject the ink modulated in accordance with the image to be recorded only for a predetermined time period (predetermined number of lines).

In the case where image data that should be printed remains in the data memory 27 even after the ink modulated in accordance with the image is ejected for the predetermined time period, the ejection of the ink is performed again. When the ejection of the ink corresponding to the whole of this image data is completed, the recording of this record image onto the recording medium P is completed and it is checked whether image data that should be next recorded exists in the data memory 27. In the case where such image data exists and a recording designation has been issued, image recording is performed in a like manner to that described above.

Also, image data, whose recording is completed, is deleted from the data memory 27 automatically or in accordance with a designation from the user. It is preferable that it is possible to selectively perform this deletion of image data.

In this embodiment, there occurs no problem even if the resumption of image recording is performed after the user inputs any designation (the turning-on of the recording designation switch 25, for instance). Also, there occurs no problem even if the printing apparatus 1 is automatically powered off concurrently with the forced termination of image recording and the image recording is resumed after the printing apparatus 1 is powered on again by the user. Note that in the case where the forced recording switch 24 is turned on, printing is performed regardless of the direction of an image.

In this embodiment, it is possible to rotate the direction of an image, a text, or the like that the user wishes to print to an arbitrary direction. Therefore, even in the case where it is impossible to move the recording medium P, for instance, it becomes possible for the user to print the image or the text that he/she wishes to print in a desired direction while checking a print state. Also, even in the case where the auxiliary scanning direction A of the enclosure 2 is limited and it is impossible to print an image or the like in the desired direction due to a circumferential state, it becomes possible to print the image or the like in the desired direction through the rotation or the like of the image or the like in the manner described above. In the case where printing is performed for a tag seal, for instance, by performing the printing through rotation of an image by 180°, it becomes possible to print an image or a text on both sides thereof without changing the scanning direction, with the image or the text printed on the both sides being directed in the same direction when the tag seal is folded. It is also possible to print an image while changing the direction thereof in various directions. Consequently, it becomes unnecessary to receive the same image multiple times from an external device by changing the direction thereof. Also, there occurs no problem even if data storing medium that stores at least one of text data and image data is connected to the data memory 27 and the at least one of the image data and the text data is stored into the data memory 27.

Further, it is possible to print an image or a text on the recording medium P by reversing the front and back thereof (in a plane-symmetrical manner). Consequently, in the case where the recording medium P is made of a transparent material like glass, for instance, it is possible to obtain a desired image or text when viewed from a front surface side by printing at least one of an image or a text on the back surface of the recording medium P after reversing the front and back of the image or the text. In this case, the image or the text has been printed on the back surface of the recording medium P, so that it becomes possible to prevent the degradation of an image quality due to weather, rustle of clothes or the like. As described above, in this embodiment, it is possible to perform printing on either of front surface and back surface of the recording medium P. That is, it is possible to freely select a print place.

As described above, in this embodiment, even if the direction of the printing apparatus 1 is limited and an image or a text is not in a predetermined direction, it is possible to print the image or the text in the predetermined direction by changing the direction of the image or the text to be printed. Also, the scanning direction, the image or the text to be printed, and a print state are displayed on the display device 23, so that it becomes possible for the user to perform printing while checking the direction of the image or the text and the print state. As a result, even in the case where it is difficult to move the recording medium P and it is hard to change the moving direction of the main body, it becomes possible to print a text, a drawing, or the like in a desired direction while checking the text, the drawing, or the like to be printed. Note that, in the case where text data is rotated by 90°, there occurs no problem even if a text written horizontally is changed to a text written vertically or a text written vertically is changed to a text written horizontally. Note that, in the present invention, there occurs no problem even if an image coexists with a text. Also, the image dealt with in the present invention includes an image synthesized by an external device.

In the printing apparatus 1 of the present invention, as described above, it is sufficient that the ejection head 6 is a publicly known ink jet recording head. The ejection head 6 is obtained by forming one or a plurality of nozzles in a substrate. For instance, the ejection head 6 may be of so-called top shooter type (face ink jetting) that ejects ink in a direction vertical to the substrate, or of so-called side shooter type (edge ink jetting) that ejects ink in a direction parallel to the substrate. The ejection head 6 may also be of so-called thermal ink jet type that ejects ink by utilizing heat generated by a heater, or be a recording head that ejects ink by utilizing a force generated when a diaphragm provided in an ink chamber is vibrated using a piezo element, an electrostatic force, or the like.

Also, it is preferable that on the bottom surface 2b of the enclosure 2, there is arranged an auxiliary wheel that makes it possible to record a high-quality image by preventing the floating of the recording medium P and maintaining the position of the recording medium P at the ink ejection position from the ejection head 6. It is sufficient that the auxiliary wheel is a roller that rotates in the auxiliary scanning direction A. If there is a possibility that this auxiliary wheel will contact the recording medium P after image recording (after the reception of ink), it is preferable that there is used an auxiliary wheel whose contact area with the recording medium P is small. For instance, there is a spur-shaped roller or a warty roller as a preferable example thereof.

It should be noted here that in this embodiment, no specific limitation is imposed on the construction of the ejection head 6. That is, there occurs no problem even if the ejection head 6 includes nozzle rows for light C, light M, and the like in addition to the nozzle rows 6Y, 6M, 6C, and 6K for four colors shown in FIG. 3. Also, there occurs no problem even if instead of a color printer, there is used a monochrome printer that, for instance, ejects only K ink.

Also, in this embodiment, the scanning direction is limited to one direction, although the present invention is not limited to this and scanning may be performed in any direction. In this case, it is possible to rotate image data or text data to be printed using the image processing unit 22 in accordance with the scanning direction. With this construction, even if the direction of an image or a text displayed on the display device 23 of the printing apparatus 1 with respect to the auxiliary scanning direction A does not coincide with a desired direction due to the circumferential environment, the immobility of the recording medium P, or another reason, it is possible to rotate the image or the text to the desired direction and also to perform printing while checking a print state. Note that it is preferable that the scanning direction is displayed on the display device 23. For instance, in the case where the enclosure 2 is scanned from the right to the left, printing is performed from the right side of the image or the text on the display device 23. Also, in the case where the enclosure 2 is scanned from the left to the right, printing is performed from the left side of the image or the text on the display device 23. Further, in the case where the enclosure 2 is scanned from the top to the bottom, printing is performed from the top side of the image or the text on the display device 23. Also, in the case where the enclosure 2 is scanned from the bottom to the top, printing is performed from the bottom side of the image or the text on the display device 23. Note that in this embodiment, the display device 23 is provided on the top surface 2a of the enclosure 2, thereby obtaining an integral construction. However, the present invention is not limited to this and there occurs no problem even if there is realized a construction by which the display device 23 can be separated from the enclosure 2 by connecting the display device 23 to the enclosure 2 through a cable or the like.

Also, the user sets the scanning direction in the embodiment described above. However, there occurs no problem even if the moving direction is detected from the initial rotation of the wheels 4 during scanning and the direction of an image or a text to be printed is automatically changed by the image processing unit 22 in accordance with the detected moving direction.

The scanning type printing apparatus 1 of the present invention has been described in detail above, although the present invention is not limited to the embodiment described above. That is, needless to say, it is possible to make various kinds of modifications and changes without departing from the gist of the present invention. For instance, the user hand-holds and moves the printing apparatus 1 in the embodiment described above. However, there occurs no problem even if the printing apparatus 1 is a self-propelled printing apparatus that uses a method with which, for instance, a driving source is provided for the wheel axles 3.

As has been described in detail above, with the present invention, even in the case where it is difficult to move a recording medium and it is hard to change the moving direction of a main body, it becomes possible to print a text, a drawing, or the like in a desired direction.

What is claimed is:

1. A scanning type printing apparatus which prints at least one of an image and a text on a recording medium in accordance with at least one of image data and text data while moving on the recording medium, said scanning type printing apparatus comprising:

moving means for moving the scanning type printing apparatus on the recording medium;

an image processing unit that, prior to printing, rotates said at least one of the image and the text to be printed on the recording medium based on said at least one of the image data and the text data and/or reverses front and back thereof;

an ejection head that includes at least one nozzle that ejects ink and at least one ink ejection means, each of which is arranged so as to correspond to each of said at least one nozzle and is modulation-driven in accordance with said at least one of said image data and said text data processed by the image processing unit; and a storage unit in which said at least one of the image data and the text data supplied from one of the external device and a data storing medium is stored, wherein image data of a plurality of images and a plurality of pieces of text data are stored in the storage unit; and said image processing unit synthesizes at least one of image data of a first image and a first piece of text data read out from said storage unit with at least one of image data of a second image and a second piece of text data read out from said storage unit.

2. The scanning type printing apparatus according to claim 1, further comprising:

a receiving unit that receives said at least one of the image data and the text data supplied from an external device.

3. The A scanning type printing apparatus which prints at least one of an image and a text on a recording medium in accordance with at least one of image data and text data while moving on the recording medium, said scanning type printing apparatus comprising:

moving means for moving the scanning type printing apparatus on the recording medium;

an image processing unit that prior to printing, rotates said at least one of the image and the text to be printed on the recording medium based on said at least one of the image data and the text data and/or reverses front and back thereof;

an ejection head that includes at least one nozzle that effects ink and at least one ink election means, each of which is arranged so as to correspond to each of said at least one nozzle and is modulation-driven in accordance with said at least one of said image data and said text data processed by the image processing unit;

a receiving unit that receives said at least one of the image data and the text data supplied from an external device; and a storage unit in which said at least one of the image data and the text data supplied from one of the external device and a data storing medium is stored, wherein said at least one of the image data and the text data received by the receiving unit is stored in the storage unit, and said image processing unit synthesizes said at least one of the image data and the text data received by the receiving unit from the external device with said at least one of the image data and the text data stored in the storage unit.

4. The scanning type printing apparatus according to claim 1, further comprising:

a display device that displays said at least one of the image and the text to be printed on the recording medium, wherein said display device displays said at least one of the image and the text which have been rotated and/or whose front and back have been reversed prior to the printing.

5. The scanning type printing apparatus according to claim 1, wherein said ejection head is modulation-driven in further accordance with said at least one of said image data and said text data in synchronization with the movement of the scanning type printing apparatus.

6. The scanning type printing apparatus according to claim 1, wherein said image processing unit rotates said at least one of the image and the text to be printed on the recording medium based on said at least one of the image data and the text data and/or reverses front and back thereof in response to an input received from a user input device.

7. The scanning type printing apparatus according to claim 6, wherein the degree of rotation of said at least one of the image and the text is in accordance with the input received from the user input device.

8. The scanning type printing apparatus according to claim 1, where in said moving means is a rolling means coupled to the scanning type printing apparatus, and which rolls the scanning type printing apparatus on the recording medium.

9. The scanning type printing apparatus according to claim 1, further comprising:

a storage unit which said at least one of the image data and the text data supplied from one of an external device and a data storing medium is stored.

* * * * *